(12) United States Patent
Peters et al.

(10) Patent No.: US 6,295,614 B1
(45) Date of Patent: Sep. 25, 2001

(54) APPARATUS FOR ESTIMATING BIT ERROR RATE BY SAMPLING IN WDM COMMUNICATION SYSTEM

(75) Inventors: Kurt Peters, Albuquerque, NM (US); Qi Wu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/517,678

(22) Filed: Mar. 2, 2000

(51) Int. Cl.[7] .................................................... G06F 11/00
(52) U.S. Cl. ............................................ 714/704; 714/707
(58) Field of Search ..................................... 714/704, 707

(56) References Cited

U.S. PATENT DOCUMENTS

| | | |
|---|---|---|
| 4,367,550 | 1/1983 | Douverne . |
| 4,566,100 | 1/1986 | Muzuno . |
| 5,036,515 | 7/1991 | Freeburg . |
| 5,299,201 * | 3/1994 | Carusone, Jr. et al. . |
| 5,325,397 | 6/1994 | Scholz . |
| 5,455,536 | 10/1995 | Kono . |
| 5,623,497 | 4/1997 | Shimawaki . |
| 5,764,651 * | 6/1998 | Bullock et al. . |
| 5,768,285 | 6/1998 | Griep . |
| 5,870,211 | 2/1999 | Yoshida . |
| 5,870,213 * | 2/1999 | Ishikawa et al. . |

* cited by examiner

*Primary Examiner*—Phung M. Chung
(74) *Attorney, Agent, or Firm*—Harness, Dickey & Pierce, P.L.C.

(57) ABSTRACT

A sampling system for estimating the bit error rate of a signal carried by a communication system is provided. The sampling system includes an optical transmission medium for carrying an optical signal. A clock regenerator circuit is connected to the optical transmission medium. The clock regenerator circuit receives the optical signal and generates a synchronous clock signal. A clock divider circuit receives the synchronous clock signal and produces a divided clock signal. A sampling circuit receives a divided clock signal and produces a digitized signal. A threshold determination circuit compares the digitized circuit to a predetermined threshold value. The threshold determination circuit also produces an indicator signal representing the logic value of the digitized signal. In order to estimate the bit error rate, a histogram processor receives the digitized signal and the indicator signal, and generates a histogram representing statistical information about the optical signal.

18 Claims, 2 Drawing Sheets

APPARATUS FOR ESTIMATING BIT ERROR RATE BY SAMPLING IN WDM COMMUNICATION SYSTEM

BACKGROUND OF THE INVENTION

1. Field of the Invention

The present invention relates generally to an apparatus for estimating bit error rate (BER). More particularly, the present invention is directed to a sampling circuit for estimating BER in a wavelength division multiplexing (WDM) communication system.

2. Technical Background

The performance of optical communication systems is generally determined by the bandwidth or data rate of information that can be carried by the communication system. As higher bandwidth optical fibers are developed and higher bandwidth optical communication systems are implemented, it becomes increasingly important to measure the bit error rate (BER) of the signals carried by the optical fiber or communication system. Wavelength division multiplexing (WDM) is one technique for increasing the bandwidth of an optical communication system.

Wavelength division multiplexing (WDM) is the practice of transmitting data streams at multiple wavelengths along a single optical fiber in order to increase the total rate of data transmission along that fiber. WDM also offers the possibility to preform operations upon each wavelength individually. These operations might include adding each wavelength to, or dropping each wavelength from the main data stream, or changing the particular wavelength's intensity or other properties, at locations intermediate to its point of origin and its point of termination. At present, the number of wavelengths used in optical communication systems is increasing, and the number and complexity of different operations performed on the signal, which may effect one or more signals differently than the others is also increasing. This motivates efforts to develop devices for optical monitoring of individual signal wavelengths.

Determining the bit error rate in a wavelength division multiplexing (WDM) channel in an optical fiber is essential for determining and maintaining the health of a WDM communication network. This capability for monitoring the system would ideally, measure channel capacity or bit error rate in a digital communication system independent of the type of modulation present through the channel. In an effort to determine BER in a WDM channel, it is desirable to employ low speed sampling for determining the statistics and/or histogram of the transmitted signals. It is further desirable to implement a sampling technique which offers independence from the transmitted format of the signal, and which can be implemented at low cost.

SUMMARY OF THE INVENTION

In accordance with the teachings of the present invention, a sampling system for estimating the bit error rate of a signal carried by a communication system is disclosed. The sampling system includes an optical transmission medium for carrying an optical signal. A sampling circuit is connected to the optical transmission medium for receiving the optical signal and producing a digitized signal. A random trigger circuit is connected to the sampling circuit. The random trigger circuit provides a random drive signal to the sampling circuit. A threshold determination circuit is connected to the sampling circuit for comparing the digitized signal to a predetermined threshold value. The threshold determination circuit produces an indicator signal representing the logic value of the digitized signal. A histogram processor receives the digitized signal and the indicator signal and generates a histogram representing statistical information about the optical signal. The sampling system may also be configured for triggering off of the positive rising edge or the negative falling edge of the optical signal.

In another configuration, the sampling system includes an optical transmission medium for carrying an optical signal. A clock regenerator circuit is connected to the optical transmission medium. The clock regenerator circuit receives the optical signal and generates a synchronous clock signal. A clock divider circuit receives the synchronous clock signal and produces a divided clock signal. A sampling circuit receives a divided clock signal and produces a digitized signal. A threshold determination circuit compares the digitized circuit to a predetermined threshold value. The threshold determination circuit also produces an indicator signal representing the logic value of the digitized signal. In order to estimate the bit error rate, a histogram processor receives the digitized signal and the indicator signal, and generates a histogram representing statistical information about the optical signal.

BRIEF DESCRIPTION OF THE DRAWINGS

The various advantages of the present invention will become apparent to one skilled in the art by reading the following specification and appended claims, and by referencing the following drawings in which:

DETAILED DESCRIPTION OF THE PREFERRED EMBODIMENTS

The present invention discloses three techniques for determining transmitted data probability density functions based on low sampling rates in a WDM channel. An important feature of the present invention is the inclusion of a triggered, high-speed, sample-and-hold circuit with charge times coincident with the transmission speed of the optically transmitted signal. Three related circuits and techniques are presented for extracting the statistics of the received signal to arrive at varying levels of accuracy for predicting bit error rate (BER), each providing varying degrees of independence from the signal transmission format.

Each channel is selected in the WDM fiber through the use of a dispersive device, such as a blazed grating or prism. Alternatively the dispersive device may include a tunable optical filter. This feature allows a single circuit to be used for monitoring multiple wavelengths. Once the particular WDM channel is selected from the others, the channel is processed by the receiver electronics which form a portion of the sampling circuit. The receiver electronics measure the voltage level of the transmitted logic ones and logic zeros through the use of an A/D converter. The statistics of these signals are recorded to determine a threshold level of the logic values and to determine histograms of the received signals. The overlapping tails of the resulting histograms are fitted to appropriate curves in order to arrive at an estimate of the bit error rate.

Figure 1:
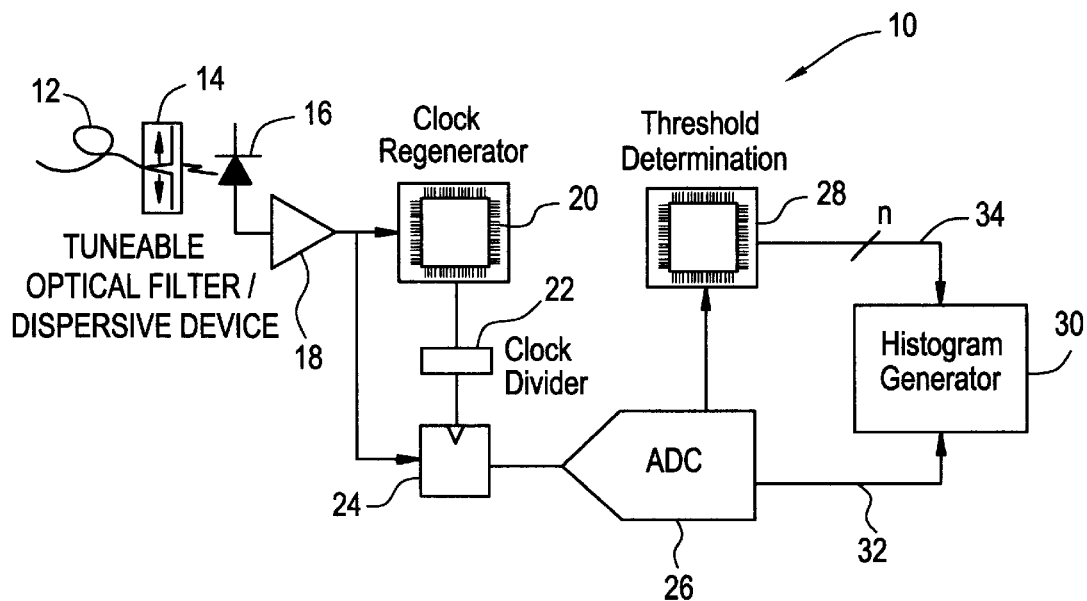
FIG. 1 is a schematic diagram of a sampling circuit for estimating bit error rate in accordance with a preferred embodiment of the present invention.

Turning now to FIG. 1, sampling circuit 10 is shown. More specifically, sampling circuit 10 discloses a technique for synchronously sampling the WDM channel from an optical fiber 12. The particular WDM channel is selected from optical fiber 12 via a dispersive device 14, such as a tunable optical filter which allows any one of the wavelengths to be sampled for BER. The output from the dispersive device 14 is received by a photodiode 16 which converts the optical signal representing the WDM channel into an electrical signal. The resulting electrical signal is amplified by a signal amplifier 18. As shown, the output from the signal amplifier 18 is provided to a clock regenerator 20 and also to the input of a sample and hold latch 24. An important feature of the present invention is the inclusion of a triggered, high-speed, sample and hold circuit for accuracy sampling the electronic signal. The clock regenerator 20 is used for extracting the clock and signal timing information of the electrical signal representing the WDM channel. In this manner, the clock regenerator 20 can synchronize with the electronic signal. This extracted clock is then frequency-divided through the use of a clock divider 22, which is preferably implemented via a phase-locked loop (PLL) circuit to allow samples to be taken at a much lower sampling rate than the signal data rate. In order to maintain synchronization, the clock regenerator 20 and PLL 22 must be tuned to be a multiple of the bit rate of the transmitted signal.

The output from the sample and hold latch 24 is provided to an analog-to-digital (A/D) converter 26. A first output from A/D converter 26 is provided to a threshold determination circuit 28. A second output from the A/D converter 26 is provided to a histogram generator 30 via data line 32. The threshold determination circuit 28 includes n-bit data lines 34 which output signal threshold information to the histogram generator 30. The output from A/D converter 26 on line 32 is preferably a digital signal provided serially to the histogram generator 30 which represents the actual voltage level of the sampled electronic signal. The output from the threshold determination circuit 28 is an indicator signal which tells the histogram generator 30 whether the sampled electronic signal represents a logic zero value or a logic one value. This comparison is accomplished through the threshold determination circuit 28 by comparing the value of the sampled electronic signal to a predetermined threshold value. The histogram generator 30 is preferably a statistical processor which compares the indicator signal with the actual voltage level and tracks the statistics associated with this comparison for purposes of estimating the bit error rate. The sampling circuit 10 and histogram generator 30 will ideally yield a dual-humped histogram which statistically represents the bit error rate of the signal carried by the communication system. The histogram generator 30 may also be provided with a graphical interface for producing a histogram chart for visual inspection.

Figure 2:
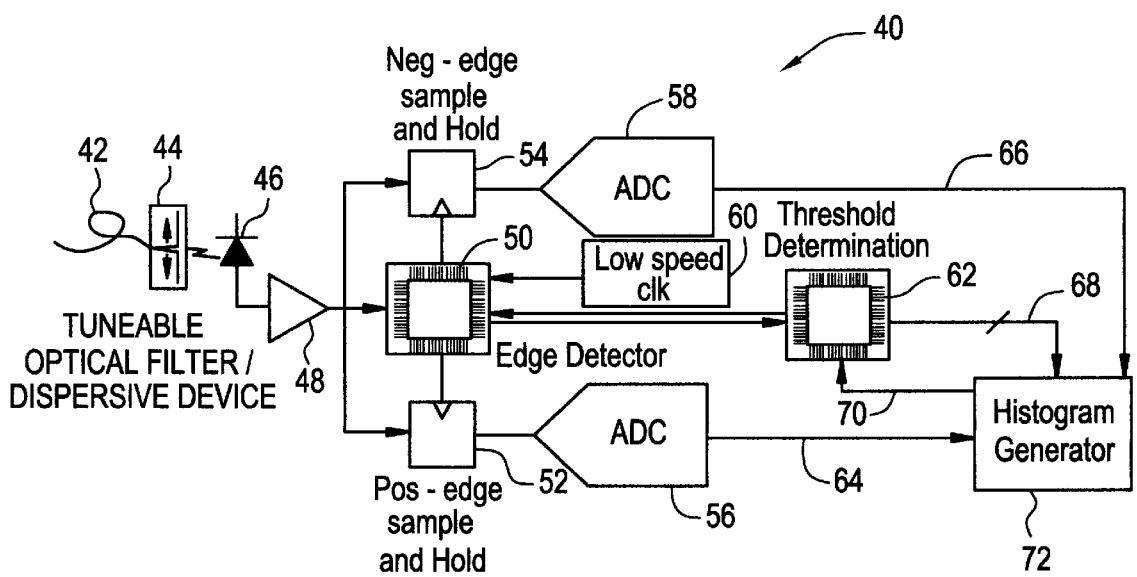
FIG. 2 is a schematic diagram of a sampling circuit for estimating bit error rate in accordance with another preferred embodiment of the present invention.

With reference to FIG. 2, sampling circuit 40 is shown in accordance with another preferred embodiment of the present invention. As will be appreciated, sampling circuit 40 discloses an edge detection circuit for determining bit error rate in a WDM communication system. As described above, the particular WDM channel is selected from the optical fiber 42 via a dispersive device 44, such as a tunable optical filter described above. The output from the dispersive device 44 is received by a photodiode 46 which converts the optical signal representing the WDM channel into an electrical signal. The resulting electrical signal is amplified by a signal amplifier 48. The output from the signal amplifier 48 is provided to an edge detector circuit 50. The output from the signal amplifier 48 is also provided to a positive edge sample and hold latch 52 and a negative edge sample and hold latch 54.

Figure 4:
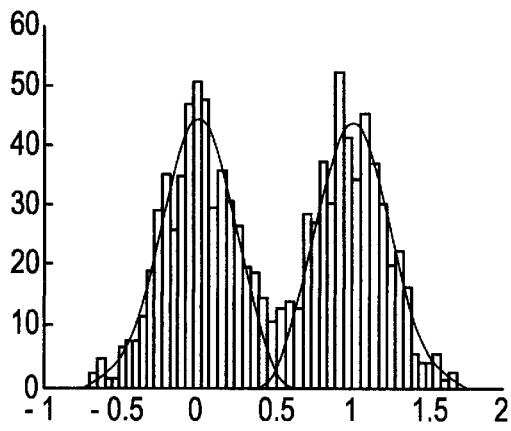
FIG. 4 is a graph showing the expected histogram of statistical data produced by the circuits of FIGS. 1 and 2.

A first output of the edge detector circuit 50 is also provided to the latching input of the positive edge sample and hold latch 52. A second output of the edge detector circuit 50 is provided to the latching input of the negative edge sample and hold latch 54. It should be understood that the sampling circuit 40 can be configured to take samples on either a positive (rising) edge, a negative (falling) edge, or both. A low speed clock circuit 60 is utilized for driving the edge detector circuit 50. The edge detector circuit 50 also communicates by directionally with a threshold determination circuit 62. The threshold determination circuit 62 includes n-bit data lines 68 which output threshold information as described above to the histogram generator 72. The histogram generator 72 can also provide a feedback signal via line 70 to the threshold determination circuit 62. As shown, the output from the positive edge sample and hold latch 52 is provided to an A/D converter 56 which then provides a digitized voltage signal to the histogram generator 72 via line 64. Similarly, the output from the negative edge sample and hold latch 54 is provided to an A/D converter 58, which then provides a digitized voltage signal to the histogram generator 72 via line 66. As will be appreciated, the edge detector circuit 50 includes the appropriate logic for routing positive edge information to the positive edge latch 52, and for providing negative edge information to the negative edge latch 54. An exemplary histogram produced by either histogram generator 30 (FIG. 1) or histogram generator 72 (FIG. 2) is shown in FIG. 4.

As part of the embodiment of FIG. 2, samples of the WDM channel are taken on the positive or negative edge of the received signal. After each sample is processed, the low speed clock 60 allows the next sample to be taken. The edge detector or edge triggering circuit 50 can use feedback from the threshold determination circuit 62 for adjusting the triggering level in order to reduce glitches and false readings. As part of the sampling technique for the circuit of FIG. 2, the dynamic range required of the sample-and-hold circuitry can be reduced because the negative edge triggered circuit will only be looking at the zeros while the positive edge triggered circuit will only be looking at the logic one values. When operating in either the positive edge mode or the negative edge mode, the sampling circuit 40 and histogram generator 72 will ideally yield a single-humped histogram which statistically represents the bit error rate of the signal carried by the communication system.

Figure 3:
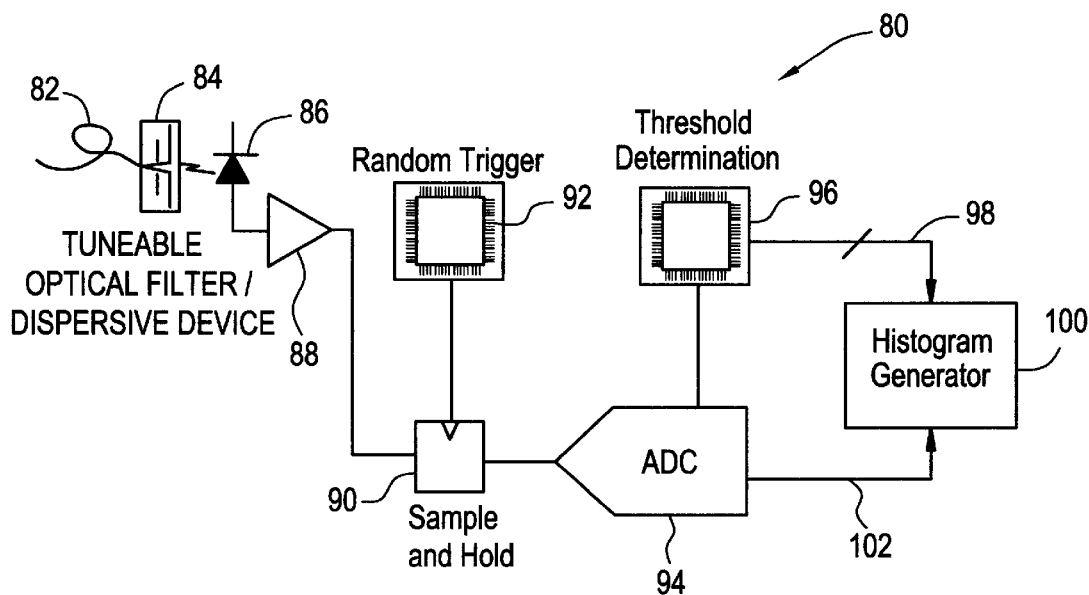
FIG. 3 is a schematic diagram of a sampling circuit for estimating bit error rate in accordance with another preferred embodiment of the present invention.

Turning now to FIG. 3, sampling circuit 80 is shown in accordance with another preferred embodiment of the present invention. More specifically, sampling circuit 80 discloses a random sampling circuit for determining the bit error rate in a WDM communication system. The particular WDM channel is selected from an optical fiber 82 via a dispersive device 84, preferably a tunable optical filter as described above. The output from the dispersive device 84 is received by a photodoiode 86 which converts the optical signal representing the WDM channel into an electrical signal. The resulting electrical signal is amplified by a signal amplifier 88. As shown, the output from the signal amplifier 88 is provided to a sample and hold latch 90. A random trigger circuit 92 is utilized for controlling the random sampling rate of the sample and hold latch 90.

The output from the sample and hold latch 90 is provided to an A/D converter 94. A first output from A/D converter 94 is provided to a threshold determination circuit 96. A second output from the A/D converter 94 is provided to a histogram generator 100 via data line 102 for providing a digitized voltage signal for statistical analysis purposes. The threshold determination circuit 96 includes n-bit data line 98 which output threshold information to the histogram generator 100 as described above.

Figure 5:
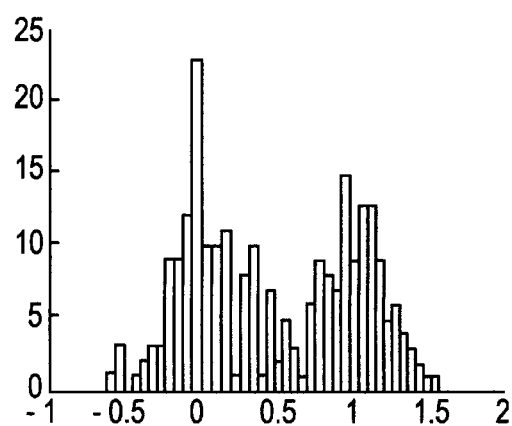
FIG. 5 is a graph showing the expected histogram of statistical data produced by the circuit of FIG. 3.

As will appreciated, FIG. 3 discloses a random sampling circuit 80 for sampling the WDM channel at random time intervals. FIG. 5 shows an exemplary histogram representing the data produced by histogram generator 100 using the random sampling technique described above. As shown, random sampling will also ideally yield a dual-humped histogram since fewer samples will be available during the signal transition, as are available on the ones and zeros. These histograms then can be used to determine the threshold and variance of the signal transmitted through the optical fibers 12, 42, 82 or other medium which are in turn used for estimating the bit error rate. Additionally, the random sampling technique implemented via sampling circuit 80 can be modified to use a synchronous clock, as in FIG. 1, and achieve randomness in sampling by adding a random phase delay.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A sampling system for estimating the bit error rate of a signal carried by a communication system comprising:
   an optical transmission medium for carrying an optical signal;
   a sampling circuit connected to the optical transmission medium for receiving the optical signal and producing a digitized signal;
   a random trigger circuit connected to the sampling circuit, the random trigger circuit providing a random drive signal to the sampling circuit;
   a threshold determination circuit connected to the sampling circuit for comparing the digitized signal to a predetermined threshold value, the threshold determination circuit producing an indicator signal representing the logic value of the digitized signal; and
   a histogram processor for receiving the digitized signal and the indicator signal and generating a histogram representing statistical information about the optical signal.

2. The sampling system of claim 1 wherein the optical transmission medium is an optical fiber.

3. The sampling system of claim 2 wherein the optical fiber carries a plurality of WDM channels.

4. The sampling system of claim 3 wherein a tuneable optical filter is connected to the optical fiber, the tuneable optical filter operable for selecting a WDM channel from the plurality of WDM channels.

5. The sampling system of claim 1 wherein the statistical information is representative of the error rate of the signal carried by the communication system.

6. The sampling system of claim 1 wherein the sampling circuit is a sample and hold circuit which provides a signal to an A/D converter.

7. A sampling system for estimating the bit error rate of a signal carried by a communication system comprising:
   an optical transmission medium for carrying an optical signal;
   a edge detector circuit connected to the optical transmission medium, the edge detector circuit receiving the optical signal and generating a positive edge timing signal and a negative edge timing signal;
   a clock circuit for driving the edge detector circuit at a data rate lower than the data rate associated with the optical signal;
   a positive edge sampling circuit for receiving the positive edge timing signal and producing a digitized positive edge signal;
   a negative edge sampling circuit for receiving the negative edge timing signal and producing a digitized negative edge signal;
   a threshold determination circuit for receiving signal information from the edge detector circuit and comparing the signal information to a predetermined threshold value, the threshold determination circuit producing an indicator signal representing the logic value of the signal information; and
   a histogram processor for receiving the digitized positive edge signal, the digitized negative edge signal and the indicator signal and generating a histogram representing statistical information about the optical signal.

8. The sampling system of claim 7 wherein the optical transmission medium is an optical fiber.

9. The sampling system of claim 8 wherein the optical fiber carries a plurality of WDM channels.

10. The sampling system of claim 9 wherein a tuneable optical filter is connected to the optical fiber, the tuneable optical filter operable for selecting a WDM channel from the plurality of WDM channels.

11. The sampling system of claim 7 wherein the statistical information is representative of the error rate of the signal carried by the communication system.

12. The sampling system of claim 7 wherein the sampling circuit is a sample and hold circuit which provides a signal to an A/D converter.

13. A sampling system for estimating the bit error rate of a signal carried by a communication system comprising:
   an optical transmission medium for carrying an optical signal;
   a clock regenerator circuit connected to the optical transmission medium, the clock regenerator circuit receiving the optical signal and generating a synchronous clock signal;
   a clock divider circuit for receiving the synchronous clock signal and producing a divided clock signal;
   a sampling circuit for receiving the divided clock signal and producing a digitized signal;
   a threshold determination circuit for comparing the digitized signal to a predetermined threshold value, the threshold determination circuit producing an indicator signal representing the logic value of the digitized signal; and a histogram processor for receiving the digitized signal and the indicator signal and generating a histogram representing statistical information about the optical signal.

14. The sampling system of claim 13 wherein the optical transmission medium is an optical fiber.

15. The sampling system of claim 14 wherein the optical fiber carries a plurality of WDM channels.

16. The sampling system of claim 15 wherein a tuneable optical filter is connected to the optical fiber, the tuneable optical filter operable for selecting a WDM channel from the plurality of WDM channels.

17. The sampling system of claim 13 wherein the statistical information is representative of the error rate of the signal carried by the communication system.

18. The sampling system of claim 13 wherein the sampling circuit is a sample and hold circuit which provides a signal to an A/D converter.

* * * * *